United States Patent
Alshehri et al.

(10) Patent No.: US 9,346,678 B1
(45) Date of Patent: May 24, 2016

(54) METHOD OF FABRICATING MACROPOROUS CARBON CAPSULES FROM POLLEN GRAINS

(71) Applicant: KING SAUD UNIVERSITY, Riyadh (SA)

(72) Inventors: Saad M. Alshehri, Riyadh (SA); Tansir Ahmad, Riyadh (SA); Hamad A. Al-Lohedan, Riyadh (SA); Yusuke Yamauchi, Sengen (JP)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 14/884,722

(22) Filed: Oct. 15, 2015

(51) Int. Cl.
*C01B 31/02* (2006.01)
*B01J 20/30* (2006.01)
*B01J 20/28* (2006.01)
*C01B 31/08* (2006.01)

(52) U.S. Cl.
CPC ............ *C01B 31/02* (2013.01); *B01J 20/28004* (2013.01); *B01J 20/28073* (2013.01); *B01J 20/28085* (2013.01); *B01J 20/3078* (2013.01); *C01B 31/086* (2013.01)

(58) Field of Classification Search
CPC .............................. C01B 31/02; C01B 31/086
See application file for complete search history.

(56) References Cited

U.S. PATENT DOCUMENTS 6,181,823 B1    1/2001   Takahashi

*Primary Examiner* — Stuart Hendrickson
(74) *Attorney, Agent, or Firm* — Richard C. Litman

(57) ABSTRACT

A method of producing macroporous carbon capsules includes providing pollen grains from date palm (*Phoenix dactylifera* L.) males, drying the pollen grains, heating the dried pollen grains to a temperature of at least 500° C. under an atmosphere of $N_2$ gas to produce macroporous carbon capsules. The macroporous carbon capsules produced from the above method can have an oval shape with a diameter in the range of about 18 μm to about 20 μm. The macroporous carbon capsules have a mean pore diameter in the range of about 50 nm to about 450 nm. The pores are three-dimensionally interconnected via nanoscopic carbon walls. The carbon walls have a thickness of about 4 μm.

12 Claims, 5 Drawing Sheets

METHOD OF FABRICATING MACROPOROUS CARBON CAPSULES FROM POLLEN GRAINS

BACKGROUND OF THE INVENTION

1. Field of the Invention

The present invention relates to a method of fabricating macroporous carbon capsules, and particularly, to a method of fabricating macroporous carbon capsules from a natural source.

2. Description of the Related Art

Porous carbon materials are utilized for various applications, including drug delivery agents, heat-insulating materials, buffer materials, pollutant absorbent materials and catalyst carriers.

Several plant parts, such as wood, leaves, fruit, and spores have a polymeric structure consisting of carbohydrates (cellulose and hemicellulose) lignin, intine and sporopollenin with small amounts of extraneous organic chemicals and minerals. Carbonization of plant residue can give rise to a solid mainly composed of carbon atoms, heteroatoms (mainly hydrogen and oxygen), and a mineral matter usually provided as ash. Such a solid can be wood charcoal. Pyrolysis of lignocellulosic materials generally produces char, tar, volatile liquids and gases. The volatile materials are lost during the wood carbonization process and form a carbon skeleton and a rudimentary pore structure. The residual elementary carbon atoms, visualized as stacks of flat aromatic sheets, are cross-linked in a random manner, leaving interstices which may become filled with tars and other decomposition products or at least partially blocked by the disorganized carbon. The surface of non-graphitized carbons, such as wood charcoals, consists of graphene sheets and edges of such layers, with heteroatoms, in particular oxygen, which is predominantly located on the edges in the form of various functional groups.

A macroporous material formed from a carbon material has high electric conductivity, lightness in weight, heat resistance, chemical resistance and the like, which other macroporous materials do not possess. Accordingly, a macroporous carbon material has wide-ranging applications for heat-insulating materials, heat exchangers, filters, ceramic sintering tools, glass shaping tools, various electrodes for fuel cells, special adsorbents, various catalyst carriers, filters for vapor filtration, etc.

Thus, a method of fabricating macroporous carbon capsules from pollen grains solving the aforementioned problems is desired.

SUMMARY OF THE INVENTION

A method of producing macroporous carbon capsules includes providing pollen grains from date palm (*Phoenix dactylifera* L.) males, drying the pollen grains, heating the dried pollen grains to a temperature of at least 500° C. under an atmosphere of $N_2$ gas to produce macroporous carbon capsules. The macroporous carbon capsule produced from the present method can have an oval shape with a diameter in the range of about 18 μm to about 20 μm. The macroporous carbon capsule has a mean pore diameter in the range of about 50 nm to about 450 nm. The pores are three-dimensionally interconnected via nanoscopic carbon walls. The carbon walls have a thickness of about 4 μm.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

A method of preparing activated macroporous carbon capsules from pollen grains of male date palms (*Phoenix dactylifera* L.) includes providing natural pollen grains from date palm (*Phoenix dactylifera* L.) males, drying the pollen grains, heating the dried pollen grains under an atmosphere of $N_2$ gas to produce macroporous carbon capsules. The macroporous carbon capsules can have an oval shape with a diameter in the range of about 18 μm to about 20 μm. The macroporous carbon capsules have a three-dimensional network structure with a mean pore diameter in the range of about 50 nm to about 450 nm. As used herein, the term "macroporous carbon" refers to a porous carbon material having a network of pores that are three-dimensionally interconnected via nanoscopic carbon walls. The pores have a mean pore diameter of at least 50 nm. The natural pollen grains used as a precursor for the preparation of the macroporous carbon capsules can be of uniform size. Carbonization of the pollen grains creates lightweight, mechanically flexible, and electronically conductive sheets of macroporous carbon capsules.

The pollen grains can be dried by heating to a temperature of about 100° C. to about 105° C. in an oven for at least 24 hours. The dried pollen grains can then be heated to a temperature of about 500° C. under an inert atmosphere and held for 4 hours. Then, the temperature can be increased to about 1200° C., and held for five hours. The pore size of the macroporous carbon capsules can be controlled by controlling the heating rate. For example, the dried pollen grains can be pre-heated to temperatures of up to about 500° C. at a rate of about 0.5° C./min±0.1, 1° C./min+0.1, and 5° C./min±0.1 and held for four hours under flowing nitrogen. The temperature can then be increased to about 1200° C. at a rate of about 5° C./min±0.2 and held for five hours to carbonize the pollen grains to provide macroporous carbon capsules.

The macroporous carbon capsule obtained according to the production method described herein produces macroporous carbon capsules having a size within the range of about 18-20 μm. The macroporous carbon material is in the form of capsules having a thickness of about 10-10.2 μm. The macroporous carbon capsule typically has a pore volume of at least 0.6 $cm^3/g$. The macroporous carbon capsule has a Brunauer-Emmett-Teller (BET) surface area within about 62-64 $m^2/g$. Typically, the macroporous carbon capsules have a wall thickness of at least about 30.8-80.0 nm. Additionally, the macroporous carbon capsule possesses a three-dimensional network structure with a mean pore diameter in the range of about 50 to about 450 nm.

The following examples will further illustrate the process of fabricating the macroporpus carbon capsule but are not intended to limit its scope.

EXAMPLE 1

Method of Producing Macroporous Carbon Capsules

Figure 1:
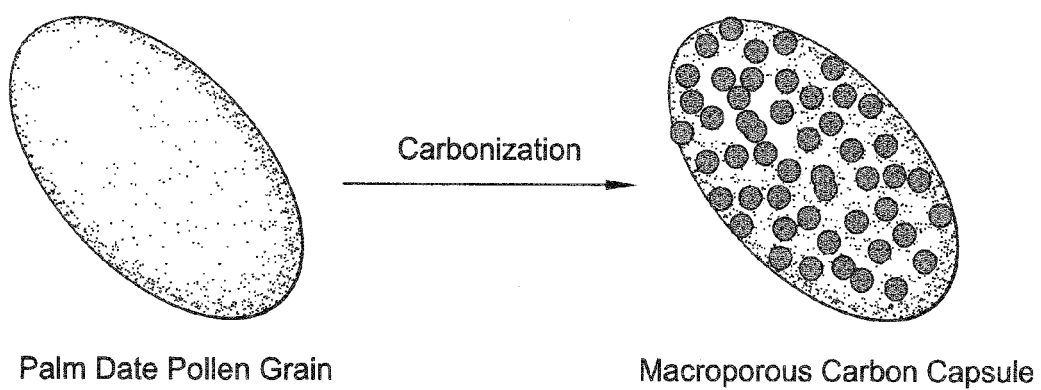
FIG. 1 is a schematic diagram showing an exemplary procedure for creating macroporous carbon capsules from pollen grains of date palm males, according to the present invention.

FIG. 1 shows an exemplary procedure for creating macroporous carbon capsules from pollen grains of date palm males. Fine powder of pollen grains of date palm males (*Phoenix dactylifera* L.) having a particle size distribution of from about 18 μm to about 20.0 μm were used as the precursor material to prepare the macroporous carbon. Initially, the pollen grains were oven-dried at 105° C. for 24 hours to remove the moisture under atmospheric pressure and under the flow of nitrogen ($N_2$) gas. After drying, 10 mg of the pollen grains were disposed in a silica crucible. The pollen grains powder was pre-heated at a rate of about 1.0° C./min±0.1 to 500° C. and held for about 4 hours under flowing nitrogen. Heating rates of about 0.5° C./min±0.1 and 5.0° C./min±0.1 were also tested for various samples. Subsequently, the temperature was then ramped at a rate of about 5° C./min±0.2 to 1200° C. and held for 5 hours to carbonize the pollen grains to obtain macroporous carbon capsules.

EXAMPLE 2

Method of Controlling the Pore Size of a Macroporous Carbon Capsule

A fine powder of pollen grains of date palm males (*Phoenix dactylifera* L.) having a particle size distribution of from about 18 to 20.0 μm were used. The fine pollen grains powder was dried at 105° C. for 24 hours under atmospheric pressure and under the flow of nitrogen. After drying, about 10 mg of the pollen grains was filled into a silica crucible. The pollen grains powder was heated at 0.5° C./min±0.1 to 500° C. and held for 4 hours under flowing nitrogen. The temperature was then ramped up at 5° C./min±0.2 to 1200° C. and held for about 5 hours to carbonize the pollen grains to obtain macroporous carbon capsules.

Figure 2:
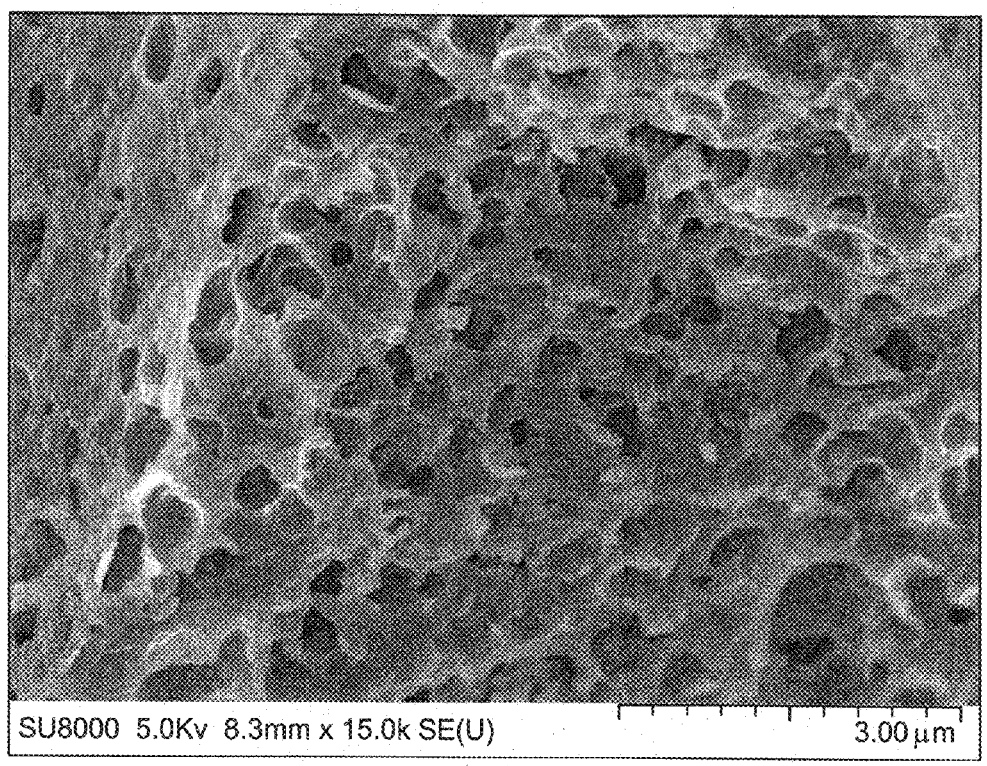
FIG. 2 is a scanning electron microscopic photograph of the macroporous carbon capsules after carbonized under a reaction system with VC/min heating rate.

The above described method of carbonization under controlled heating rate leads to the production of macroporous carbon capsules with a pore size of 50-450.0 nm and specific surface areas of 62-64 $m^2 g^{-1}$ and a pore volume of at least 0.6 $cm^3/g$. FIG. 2 depicts a SEM of the macroporous carbon capsules after carbonization under a reaction system with a heating rate of about 1° C./min. In these images, light regions correspond to carbon walls and black regions correspond to pores. The regular size of macroporous capsules, is about 18 to about 20 μm with a thickness of carbon wall of around 4 μm. The large porous size of approximately 450 nm width and the denser porous stripes of around 50 nm in width are alternated. These pores are developed in parallel, and separated by carbon walls. However, these tubular pores are interconnected through smaller array pores around the thin carbon walls. This interconnection between tubular pores is useful to increase the utilization of macropore surfaces.

Figure 3A:
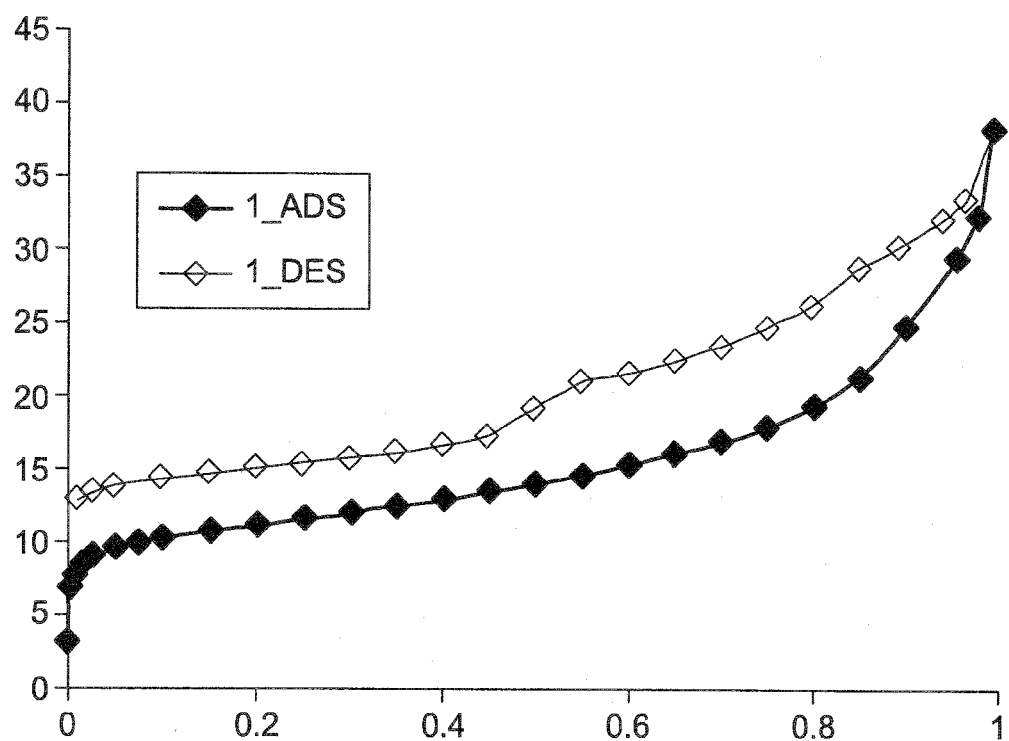
FIGS. 3A and 3B are graphs showing $N_2$ sorption of the samples obtained with 0.5 and 1° C./min heating rate respectively.
Figure 3B:
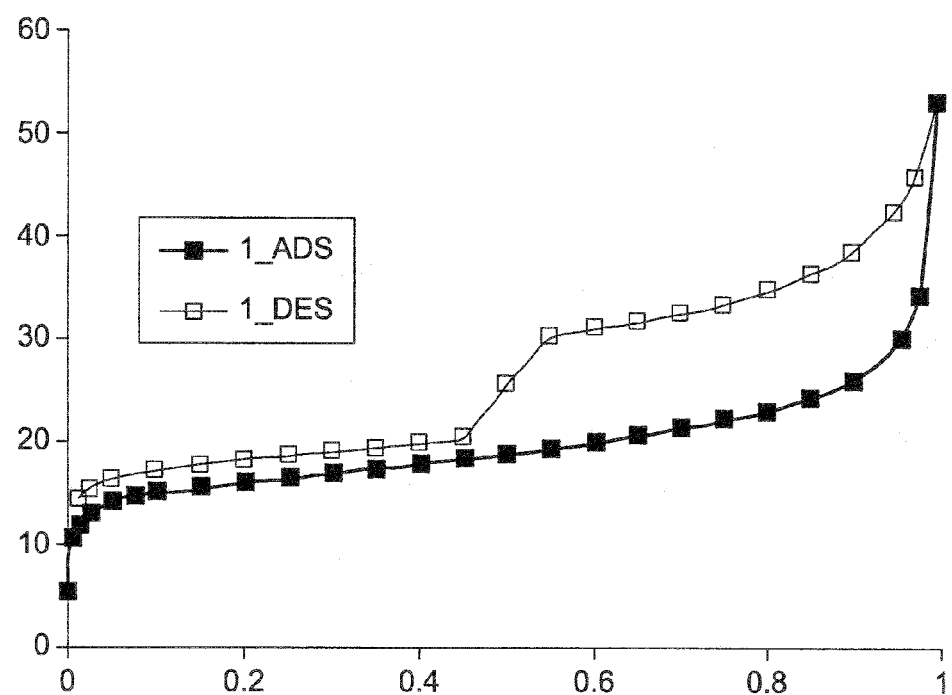
Figure 4:
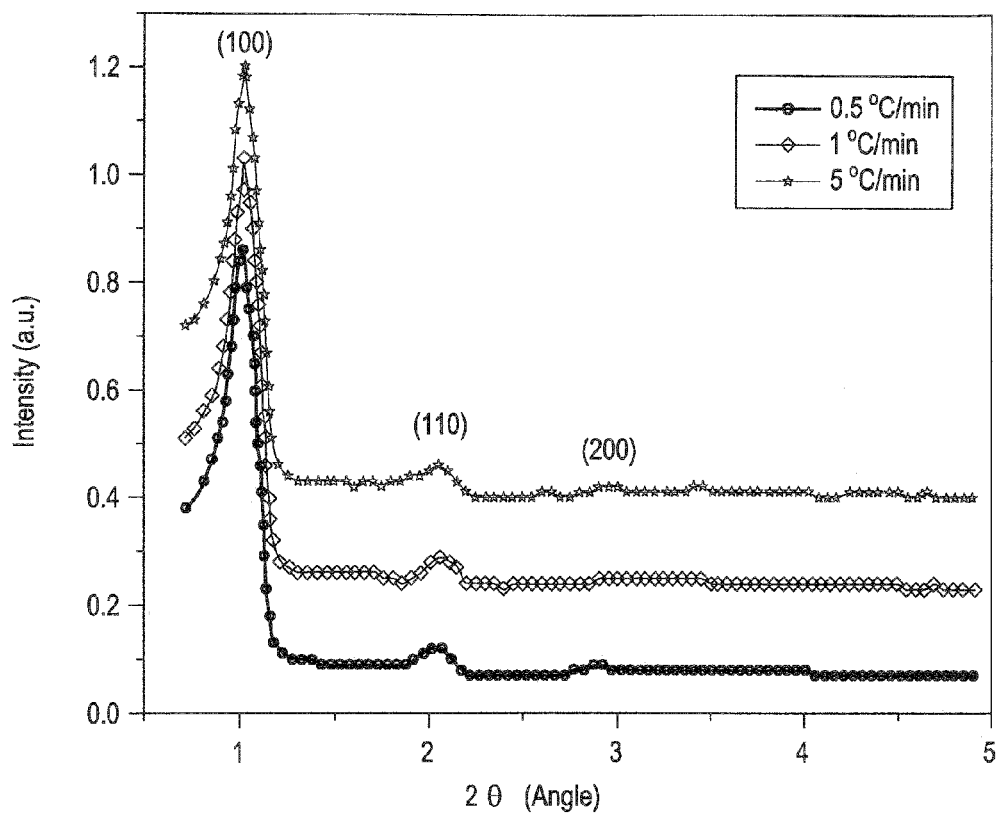
FIG. 4 is a graph showing the small angle X-ray diffraction of the samples obtained with 0.5, 1, and 5° C./min heating rate.

The nitrogen adsorption/desorption isotherms of macroporous materials are shown in FIG. 3, which exhibit a type II adsorption-desorption isotherm that corresponds to macroporous materials and a H1 hysteresis loop indicating a *facile* pore connectivity. The Brunauer-Emmett-Teller (BET) surface area is typically about 62.45 $m^2/g$ and about 64.86 $m^2/g$ from the macroporous carbon capsules prepared by the control carbonization of pollen grains with 0.5° C./min and 1° C./min heating rate respectively. In order to confirm the porous structure, the low-angle XRD pattern (FIG. 4) of the obtained carbon capsules was recorded at between 1-5 degrees. Intense peaks, noted at about 1, 2 and 2.95 of 2θ corresponding to 100, 110 and 200, support the macroporous carbon nature of the capsule.

Carbon materials with narrow pore size distributions and pore ordering are desirable for applications such as adsorption processes in aqueous systems, reverse-phase chromatography, hydrogen storage media, catalyst supports for biomolecules, and electoral conductors for sensors. In addition, the porous carbon can be utilized as electrodes and for drug delivery systems.

It is to be understood that the present invention is not limited to the embodiments described above, but encompasses any and all embodiments within the scope of the following claims.

We claim:

1. A method of fabricating macroporous carbon capsules from pollen grains comprises:
   providing pollen grains;
   drying the pollen grains;
   heating the pollen grains to carbonize the pollen grains into macroporous carbon capsules.

2. The method of fabricating macroporous carbon capsules from pollen grains according to claim 1, wherein heating the pollen grains comprises pre heating the pollen grains to about 500° C. under an inert atmosphere at a selected rate and maintaining the temperature for at least four hours, the selected rate being one of a rate of 0.5° C./min, a rate of 1° C./min, and a rate of 5° C./min.

3. The method of fabricating macroporous carbon capsules from pollen grains according to claim 2, wherein the heating further comprises increasing the temperature from about 500° C. to about 1200° C. at a rate of about 5° C./min±0.2 after the preheating step.

4. The method of fabricating macroporous carbon capsules from pollen grains according to claim 1, wherein the drying step is carried out at temperatures of about 100° C. to 105° C. in an oven for at least 24 hours.

5. The method of fabricating macroporous carbon capsules from pollen grains according to claim 1, wherein the pollen grain is obtained from the date palm males of *Phoenix dactylifera* L.

6. The method of fabricating macroporous carbon capsules from pollen grains according to claim 5, wherein the pollen grain has a particle size distribution of from about 18 to about 20 microns.

7. The method of fabricating macroporous carbon capsules from pollen grains according to claim 1, wherein the macroporous carbon capsules have a mean pore size of 50-450 nm.

8. The method of fabricating macroporous carbon capsules from pollen grains according to claim 1, wherein the macroporous carbon capsule has a diameter in the range of about 18 μm to about 20 μm.

9. The method of fabricating macroporous carbon capsules from pollen grains according to claim 1, wherein the macroporous carbon capsule has a pore volume of at least 0.6 $cm^3/g$.

10. The method of fabricating macroporous carbon capsules from pollen grains according to claim 1, wherein the macroporous carbon capsules have a width of about 10 μm.

11. The method of fabricating macroporous carbon capsules from pollen grains according to claim 1, wherein the macroporous carbon capsules have a wall thickness of about 30 nm to about 80.0 nm.

12. The method of fabricating macroporous carbon capsules from pollen grains according to claim 1, wherein said macroporous carbon capsules have an oval shape.

\* \* \* \* \*